United States Patent [19]

Hüsler

[11] 4,213,374

[45] Jul. 22, 1980

[54] FASTENER

[75] Inventor: Balthasar Hüsler, Goldau, Switzerland

[73] Assignee: HNT AG, Switzerland

[21] Appl. No.: 862,648

[22] Filed: Dec. 20, 1977

[30] Foreign Application Priority Data

Dec. 29, 1976 [CH] Switzerland ............ 16439/76

[51] Int. Cl.² ............................................. F16B 15/00
[52] U.S. Cl. ......................................... 85/13; 85/14; 85/21; 85/31
[58] Field of Search ................. 85/13, 14, 21, 31, 49

[56] References Cited

U.S. PATENT DOCUMENTS

| 294,777 | 3/1884 | Forbes | 85/49 |
|---|---|---|---|
| 314,848 | 3/1885 | James | 85/13 |
| 487,587 | 12/1892 | Streeter et al. | 85/13 |
| 2,084,544 | 6/1937 | Wilson | 85/13 |
| 2,417,423 | 3/1947 | Lang | 85/14 X |
| 2,620,705 | 12/1952 | Podvinecz et al. | 85/13 |
| 2,867,807 | 1/1959 | Anstett | 85/49 X |
| 4,014,244 | 3/1977 | Larson | 85/49 |

FOREIGN PATENT DOCUMENTS

| 2309266 | 9/1973 | Fed. Rep. of Germany | 85/31 |
|---|---|---|---|
| 284898 | 2/1928 | United Kingdom | 85/13 |

*Primary Examiner*—William H. Schultz
*Attorney, Agent, or Firm*—Roylance, Abrams, Berdo & Farley

[57] ABSTRACT

Disclosed is a fastener having a base portion and at least two anchor legs projecting from the base portion in the same general direction. At least one barb-like projection is disposed on at least one pair of the pairs of surfaces of the group comprising the remote surfaces on the outer sides of the legs and the proximate surfaces on the inner sides of the legs. Saddle surfaces begin at the one pair of surfaces and slant toward the other, opposite surfaces of the legs as they approach the free ends of the legs. Shoulder surfaces on at least the other of the pairs of surfaces of the group are generally opposite the saddle surfaces and are slanted toward the free ends of the legs, so that they form wedge-like cutting edges with the saddle surfaces at the end portions of the anchor legs.

15 Claims, 11 Drawing Figures

FASTENER

BACKGROUND OF THE INVENTION

The invention relates to a fastener with barb-like projections for improving anchoring.

As is known, either fastener or glue or both may be used for joining wooden panels. If nails are used, the nail heads remain visible, while if they are countersunk, they have to be spackled. Thus, the use of nails is limited to those components where nails do not constitute a disadvantage. The gluing together of wooden panels requires great care with regard to the glue, the degree of dryness of both panels, the tension characteristics of the types of wood to be joined together, and so on. These problems are exacerbated in the case of wall, ceiling and floor panels because the framing timber must be selected, stored, and worked with the greatest care. To prevent warping, parallel joined panels must be constructed completely symmetrically, i.e. both panels must have symmetrical dimensions, particularly the thickness. They must have matching density or specific gravity, matching expansion and shrinkage characteristics for the wood, as well as matching moisture absorption capacity. In addition, the spacing timbers located between the two panels, i.e. the so-called framing timber must be free from any warping tendencies and well seasoned, while also having the correct moisture value. Otherwise, the panels will warp. Thus, the conditions of the wooden members to be joined together constitute important parameters for the use of glue.

A classic example of the problems and difficulties of gluing is provided by door panels of hollow doors. Such doors are really nothing more than hollow glued shell elements closed on all sides. Apart from an esthetically attractive appearance, such doors have the advantage that their dimensions are standardized and the framing timber manufacturer can select and purchase in a planned manner. However, warping damage frequently leaves such doors distorted, so that they no longer close properly and also have an unattractive appearance. In addition, with hollow doors, the sound attenuation is very small because the combined thickness of the two door panels is only about 10% of the total door thickness, so that the door panels are rather thin. In addition, due to above-mentioned necessary symmetry for gluing purposes, the two door panels must have precisely the same thickness, and this has an even less favourable effect on the sound attenuation. Such panels can only have an effective sound attenuation if, for reasons pertaining to natural frequencies or resonances, the two panels have different thicknesses. This applies correspondingly in the case of wall panels which, due to the lack of symmetry, cannot be glued if the two wooden panels have different thicknesses, as would be necessary to obtain the desired sound attenuation. It must also be remembered that through gluing adjacent wooden members a homogeneous joint is formed, which is also disadvantageous from the standpoint of sound insulation.

Furthermore, when gluing panels for walls, floors, or ceilings, large quantities of wood with very varied dimensions must be carefully stored for many years. This requires large climatically controlled storage areas and drying plants. In addition, it is necessary to have air conditioned processing workshops as well as expensive machines such as hot process daylight presses or high frequency gluing installations. Thus, gluing is not only problematical and inadequate from the technical standpoint, it is in fact also very time-consuming and expensive both as regards storing and processing. The result of all these disadvantages of gluing is that glued wood shell elements are relatively expensive as compared to such elements made from inorganic materials.

A further serious disadvantage of nails is that the hitherto known wire locking nails, despite the tooth-like projections provided in the nail shaft, e.g. by means of grooves, are only inadequately anchored in the wooden panels, i.e. they easily become loose or can be removed from the panels even by a relatively small force.

SUMMARY OF THE INVENTION

In accordance with the present invention there is provided a novel fastener having a base or middle portion on which are provided at least two anchor legs which project therefrom in the same direction and are provided on opposite leg sides with barb-like or groove-like projections. The projections are provided on the remote outsides or on the facing insides of the two anchor legs, or on both their outsides and insides. The anchor legs are provided on their insides with saddle surfaces which diverge towards the free leg ends and on their outsides with smaller, opposite shoulder surfaces which converge in this direction and/or on their outsides with saddle surfaces which converge in the direction of the free leg ends and on their insides with smaller opposite shoulder surfaces which diverge in this direction, whereby the opposite shoulder surfaces form cutting edges with the saddle surfaces at the wedge-like end portions of the free anchor leg ends.

DETAILED DESCRIPTION OF THE PREFERRED EMBODIMENTS

Figure 1:
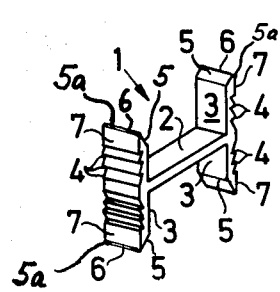
FIG. 1 is an elevated perspective of an H-shaped fastener in accordance with a preferred embodiment of the present invention.

FIG. 1 shows a fastener 1 in accordance with a first embodiment of the present invention constructed in an H-shaped manner. A base portion 2 of fastener 1 is provided with two pairs of anchor legs 3 which face one another in pairs and project away in opposite directions from the base portion 2. Thus, base portion 2 of fastener 1 forms with the two anchor legs 3 which project upwards at right angles therefrom and the two anchor legs 3 aligned in pairs which project downwards at right angles therefrom, a shape corresponding to a capital H. On facing leg sides, i.e. on the remote outsides here, the two pairs of anchor legs 3 are provided with barb-like projections 4 and at their facing insides with saddle or cam surfaces or large bevels 5 which slant so that they diverge in the direction of the free leg ends and which form cutting edges 6 at the free leg ends of anchor legs 3. The two divergent saddle surfaces 5 of each pair of anchor legs 3 form with two opposite shoulder surfaces or small bevels 5a arranged on the outsides of the two anchor legs 3 a cross-sectionally wedge-shaped end portion of anchor leg 3 (cf also FIG. 2) at each of the free ends of the two anchor legs 3. The anchor legs 3 have at least two approximately parallel outer surfaces 7, which are considerably smaller than the divergent saddle surfaces 5. The outer surfaces 7 and the saddle surfaces 5 slant so that they converge toward the free leg ends. The wedge-shaped end portions of fastener 1 which serve as displacement parts for it and which are formed by surfaces 5, 5a and 7, must be constructed in a clean and smooth manner, so that on pressing or driving in the fastener the wood displaced by the anchor legs 3 does not jam, and instead slides along the same with minimum resistance. A jamming of the wood makes the penetration of the fastener 1 into the panel or framing timber material very difficult. In order to ensure the sharpness of cutting edges 6 and the uniform construction of the pairwise converging opposite shoulder surfaces 5a at the two pairs of anchor legs 3, the opposite shoulder surfaces 5a are worked or milled by means of a milling cutter from the aluminium extruded profile (prior to its separation) from which fastener 1 is preferably made, i.e. prior to the separation of the extruded profile sections forming the individual fastener 1. The anchor legs 3 are likewise constructed in pairs.

Figure 2:
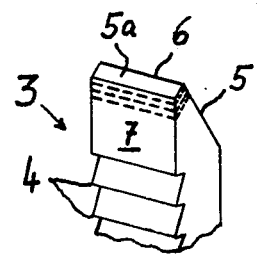
FIG. 2 is an exaggerated elevated perspective of an end portion of one of the anchor legs of the fastener of FIG. 1.

FIG. 2 shows as a fragment of FIG. 1 the free end portion of one of the four anchor legs 3 of H-shaped fastener 1 according to FIG. 1 (cf in FIG. 1 the front upwardly projecting anchor leg 3) on a larger scale. FIG. 2 clearly shows that the relatively narrow flat opposite shoulder surface 5a, the following smooth flat outer surface 7, and the underlying barb-like projections 4 are arranged on the outside of anchor leg 3, while saddle surface 5 which is considerably larger than the opposite shoulder surface 5a, i.e. extends much further downwards than the latter in the direction of the base portion 2 of H-shaped fastener 1, is arranged on the inside of anchor leg 3 (cf also FIG. 1). Depending on in which height position, i.e. how deep down, the inclined opposite shoulder surface 5a is milled on the free anchor leg end, its size can differ as is indicated by dotted lines in FIG. 2. As a result, the process of forcing in the anchor leg 3 or the whole fastener can be controlled as a function of the density or hardness of the panel material, as will be explained in greater detail hereinafter relative to FIG. 4. FIG. 2 also clearly shows that the milled, flat opposite shoulder surface 5a forms a straight sharp cutting edge 6 with the much larger also flat saddle surface 5 on the cross-sectionally wedge-shaped end portion of the free end of anchor leg 3. This applies to all four anchor legs of fastener 1 according to FIG. 1. The three surfaces 5, 5a and 7 and their reciprocal association as well as the association with projections 4 and cutting edges 6 formed by the two surfaces 5 and 5a are also present in all the other embodiments of the fastener, i.e. also in the case of anchor legs 3d, 3e and 3f of fastener 1d, 1e and 1f according to FIGS. 8, 9 and 10, in essentially the same way as is clearly shown in FIG. 2 and as explained above.

Figure 3:
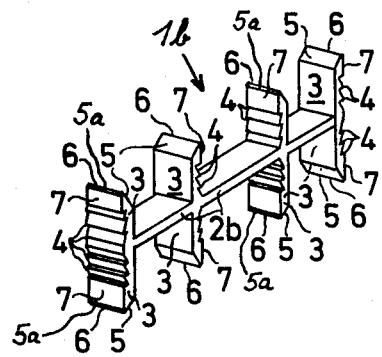
FIG. 3 is an elevated perspective of an embodiment of the present invention in which a band-like base portion is provided on each of its two longitudinal sides with in each case two pairs of facing anchor legs.

FIG. 3 shows a fastener 1b in which the base portion 2b is constructed in band-like manner and is provided on each of its two longitudinal sides with two pairs of facing anchor legs 3, whereby in its entirety it is such that in the area of each of the two ends of the base portion 2b an H-shaped fastener part is formed whose arrangement, shape and function (the latter will be subsequently explained relative to FIG. 4) completely corresponds to the H-shaped fastener 1 of FIG. 1. Thus, in all, fastener 1b of FIG. 3 has eight anchor legs 3 which in this case have the same shape, size and dimensions, whereby the shaping of the whole fastener 1b is strictly axially symmetrical with respect to the two main axes of the fastener passing through its base portion 2b. This axially symmetrical construction of the fastener also exists with fastener 1 of FIG. 1. Fastener 1b of FIG. 3 is once again a portion of an extruded profile which is preferably made from aluminium.

Figure 4:
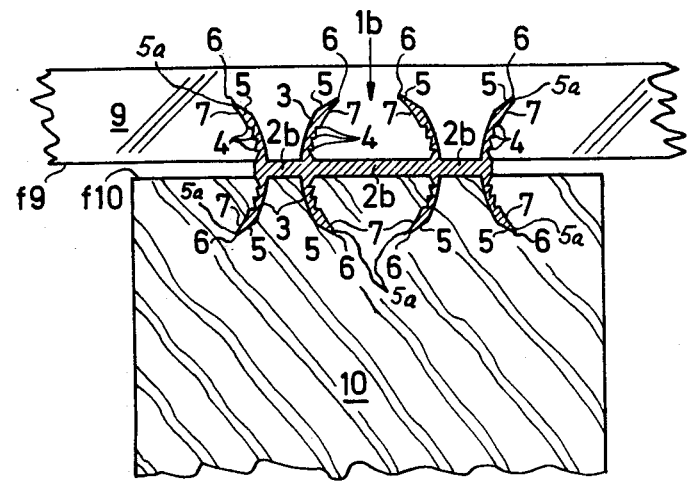
FIG. 4 is a longitudinal section of a joint between a board and a framing timber as held by the fastener of FIG. 3.

FIG. 4 shows in cross-section the fastener 1b of FIG. 3 after it has been forced into a wooden panel 9 and a framing timber 10. In this case, the facing anchor legs 3 of each of the four pairs of legs are bent outwards towards the free leg ends, i.e. are spread apart in pairs, unlike in FIG. 3 where they are still straight and parallel to one another. When anchor leg 3 penetrates wooden panel 9 or framing timber 10, in each case the four anchor legs 3 are automatically spread apart from one another and bent outwards in pairs, due to the camming action of the inclined saddle surfaces 5 thereon. In conjunction with the barb-like and in the present case saw tooth-shaped projections 4, this leads to an extremely intimate, rigid, and permanent anchoring of the fastener 1b in the wood of panel 9 or the framing timber 10. When extraction forces act on fastener 1b, the saw tooth-shaped projections 4, which are already firmly anchored in the wood, grip even more strongly therein in proportion to the extraction force exerted. The thicknesses of anchor legs 3 are adapted to the strength characteristics of the raw material for fastener 1b (aluminium) in such a way that in conjunction with the wedge angles formed between the surface 5 on the one hand, surfaces 5a and 7 on the other, and the saw tooth-profile of the barb-like projections 4b, while taking account of the structure and strength of the framing timber or the panel material, the desired spreading apart of the associated anchor legs 3 actually occurs on penetrating the framing timber or the panel.

It is very important for the satisfactory, i.e. the predetermined correct deformation of fastener 1b in panel 9 or in framing timber 10 that the material of said two parts is initially penetrated at right angles to its surface f9 or f10 at the start of the pressing-in process, this being ensured by the relatively narrow opposite shoulder surfaces 5a provided on the anchor leg ends and inclined oppositely to the saddle surfaces 5 (cf also FIGS. 2 and 3). If this outer opposite shoulder surface 5a is not provided on anchor leg 3, cutting edge 6 could bend prior to the penetration into the material, i.e. it would lose its sharpness necessary for penetrating surface f9 or f10, which would often render the pressing-in process impossible and might even lead to the breaking-off of anchor leg 3 at its base 2b (cf FIG. 3). However, if this opposite shoulder surface 5a is present, anchor legs 3 of fastener 1b penetrate the material at right angles to the surface f9 or f10 of panel 9 of framing timber 10 without the cutting edges 6 bending, becoming blunt, or slipping sideways on surfaces f9 or f10. They penetrate such a length or to such a depth that the entire opposite shoulder 5a is completely pressed into the panel 9 or the framing timber 10. Only then does the predetermined deformation process brought about by the further increasing and here diverging compressive forces on the considerably larger inner saddle surfaces 5 of the pair of anchor legs 3 commence on anchor legs 3 which further penetrate the material. The relatively high saddle surfaces 5 which diverge towards the free ends of anchor legs 3 and are arranged on the insides of the latter, or the force components of the pressing-in pressure acting on these surfaces, spread apart the pairwise facing anchor legs 3 during the further penetration of fastener 1b into the material.

The penetration of anchor legs 3 into the panel material or framing timber is considerably facilitated by the sharp cutting edges 6 formed by the smooth saddle surfaces 5 and the opposite shoulder surfaces 5a at the free leg ends and which sever the wood fibres, so that there can be no clogging of the wood or penetration of anchor legs 3 and so that less pressure is necessary for pressing the fastener 1b into the panel 9 or framing timber 10. As a result of the pressing-in process, the longitudinal main surface portions of base portion 2b engage on the facing inner surfaces f9 and f10 of panel 9 or on the framing timber 10 (cf FIG. 4).

Figure 5:
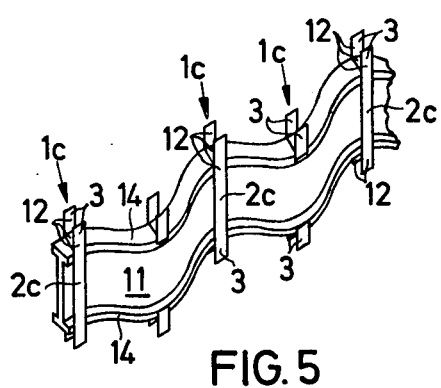
FIG. 5 is an elevated perspective of fasteners in accordance with another embodiment of the present invention which are clipped to a wave-shaped I-beam serving as a fastener support and as a spacer for a shell element.

In FIG. 5 fasteners 1c are clipped onto flanges 14 of an I-beam profile 11 which has a wave-like configuration. I-profile 11, which is preferably made from aluminium here, serves as a fastener support and at the same time as a spacer for the reciprocal spacing and connection of two panels for a shell element, as is clearly shown in FIG. 7. In this case, two U-shaped fastener portions 12 are interconnected by a band-like element 2c which forms the base portion of fastener 1c (cf FIGS. 6 and 7). The two U-shaped fastener portions 12 correspond as regards their construction to the upper or lower half of fastener 1 according to FIG. 1, whereby the base portion 2 of the fastener of FIG. 1 is split lengthwise and the thus formed U-shaped fastener portions can be spaced from one another and interconnected by a band-like connecting member. Fasteners 1c are clipped to I-profile 11 in such a way that with band-like base portion 2c they are each clamped to the I-profile 11 at the apex of a wave-shaped profile, alternating from one side to the other.

Figure 6:
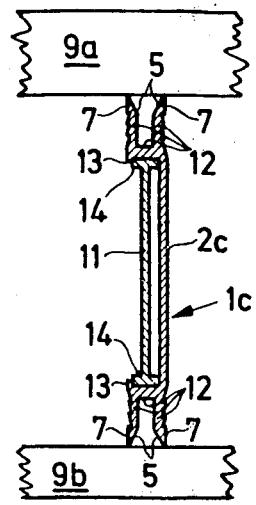
FIG. 6 is a cross-section of a segment of the fastener and beam spacer of FIG. 5 as positioned for being pressed between two wooden panel members to join them.

FIG. 6 shows in cross-section the wave-shaped I-profile 11 with the clipped-on fastener 1c prior to pressing the latter into two wooden panels 9a and 9b of different thicknesses. The substantially U-shaped portion 2c of fastener 1c has clip members 13 which laterally engage over the associated flange 14 of I-profile 11 and consequently ensure a reliable connection between fastener 1c and I-profile 11. I-profile 11 provided with fastener 1c is positioned between the two panels 9a and 9b in such a way that it has a good stability due to the undulations of the profile.

Figure 7:
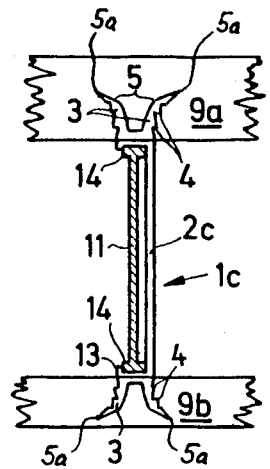
FIG. 7 is a cross-section of the arrangement of FIG. 6 after the panels have been joined by the fastener and beam spacer.

FIG. 7 shows the position of the arrangement of FIG. 6 after pressing the fasteners 1c into the wooden panels 9a, 9b. Anchor legs 3 are spread apart in pairs, as shown in FIG. 4 and as explained hereinbefore. Fasteners 1c are forced into wooden panels 9a, 9b from the insides of the latter by means of a press.

Figure 8:
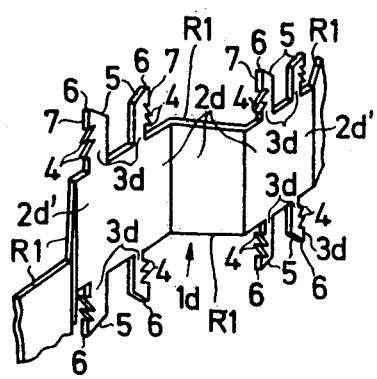
FIG. 8 is an elevated perspective view of a fastener in accordance with another embodiment of the present invention and having a zig-zag trapezoidally bent band-like base portion and anchor legs which are aligned in pairs in the longitudinal direction.

FIG. 8 shows a fastener 1d with a zig-zag-shaped, trapezoidally bent band-like base portion 2d in a three-dimensional view. The band-like base portion 2d is in each case twice opposite trapezoidally bent over its entire band width between two adjacent pairs of anchor legs 3d, and as a result has a complete reciprocating zig-zag-like configuration. The associated anchor legs 3d are aligned pairwise in planes of parallel portions 2d' of the band-like base portion 2d. In this case, the inclined saddle surfaces 5, unlike in the construction of fastener 1c according to FIGS. 5 to 7, are located in planes which extend at an angle of 90° at right angles to the longitudinal median axis of the band-like base portion 2d of fastener 1d. Obviously, the same applies for the opposite shoulder surfaces (5a in FIG. 2), not shown in FIG. 8 for reasons of clarity, for the saw tooth-like projections 4, for outer surfaces 7 at the free ends of anchor legs 3d, and for cutting edges 6. The pressing-in and deformation of the fasteners takes place in substantially the same manner as was explained hereinbefore relative to FIGS. 4, 6 and 7.

Figure 9:
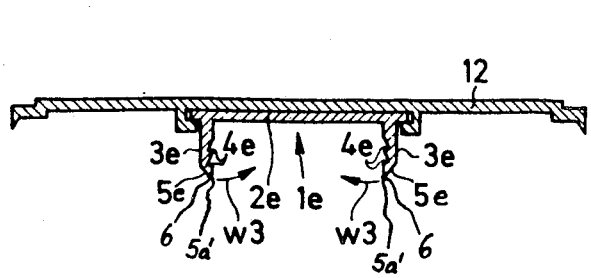
FIG. 9 is a cross-section of a fastener in accordance with another embodiment of the present invention and having a head portion which can be fixed in the channel of an extruded panel member, the fastener having facing projections as well as saddle surfaces which converge in the direction of the free leg ends arranged on the outsides of its two anchor legs, and having smaller opposite shoulder surfaces which diverge in this direction on the insides of the legs.

FIG. 9 shows a fastener 1e whose portion 2e can be inserted in an aluminium or plastic-extruded profile 12 serving as a panel. Unlike in FIGS. 1 to 8, in this case the barb-like projections 4e are arranged on the insides of the two facing anchor legs 3e, i.e. unlike in FIGS. 1 to 8, they face one another. Therefore, the inclined saddle surfaces 5e form cutting edges 6 and are arranged on the outsides of the two anchor legs 3e. They are remote from one another, that is to say they converge towards the free leg ends and do not diverge as in the embodiments of FIGS. 1 to 8. Thus, the narrow opposite shoulder surfaces 5a' are located on the facing insides of the two anchor legs 3e diverging towards the free ends of the anchor legs 3e. Consequently, on pressing-in of the fastener 1e, the two anchor legs 3a are not spread apart from one another and instead move towards one another after pressing the opposite shoulders 5a' into the wood, whereby they describe inwardly directed curved paths towards one another in the direction of arrow w3, while their free leg ends are also curved inwards towards one another. Therefore, in principle, the anchoring action is the same as with the pairs of anchor legs 3 in the embodiments of FIGS. 1 to 8.

Figure 10:
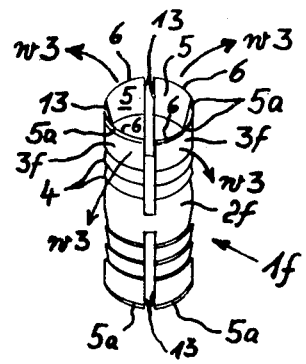
FIG. 10 is an elevated perspective of a fastener in accordance with another embodiment of the present invention which is tubular with ring segments for anchor legs.

FIG. 10 shows a fastener 1f constructed as a cup-shaped solid of revolution and on whose periphery are arranged the anchor legs 3f in the form of ring segments, whereby the circular cup base 2f forms the middle or base portion of fastener 1f. Fastener 1f can for example be manufactured from a solid round bar, e.g. of aluminium or alloyed steel, as repetition work on a cutting-off lathe in so-called screw lathe work. The solid of revolution of fastener 1f can also be continuous hollow in the direction of its longitudinal axis, i.e. it can be worked from an e.g. aluminium or steel tube. Slots 13 are radially milled into the cylindrical collar of fastener 1f, the ring segments which are left behind forming the anchor legs.

The segment-shaped anchor legs 3f are once again provided on their insides with inclined saddle surfaces 5 and on their outsides with narrow opposite shoulder surfaces 5a which form the cutting edges 6. They are also provided on their outsides with barb or groove-like projections 4. All this work can be carried out prior to milling the radial slots 13 as lathe work on a screw cutting lathe. If the hollow fastener 1f is milled into a plate, its anchor legs 3f attempt to move apart all round in bouquet-like manner, as indicated by arrows w3 in FIG. 10. Fastener 1f can for example be used for the punctiform attachment of heavy objects both on ceilings and on walls. In certain circumstances, it is merely necessary to have a cup-shaped fastener whose height is approximately half the height of 1f in FIG. 10 and in which the cup base 2f forms the base portion of the fastener.

Figure 11:
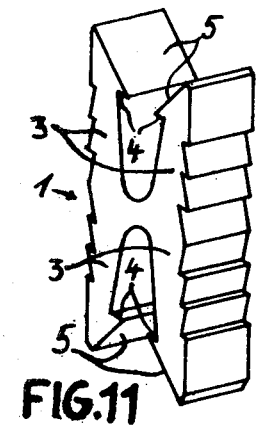
FIG. 11 is an elevated perspective of an H-shaped fastener having additional barb-like projections.

FIG. 11 shows a fastener which is H-shaped in accordance with FIG. 1. Its two anchor leg pairs 3 are additionally provided on their inner sides with barb-like projections 4 which join the saddle faces 5. When the fastener is driven into natural wood, particularly softwood, which is thereby compressed between the two legs 3, the fastness of the fastener is further increased by these inner barbs.

Whereas in the embodiment according to FIGS. 5 to 7 the fasteners 1c are clipped onto a wave-shaped band-like I-profile 11, in the embodiment of FIG. 8 the fasteners 1d are themselves constructed in a band-like manner. In both embodiments of the fastener the two panels 9a and 9b in FIGS. 6 and 7 are spaced from one another and interconnected by a spacer band member. These spacer band members are particularly suited to the production of shell elements and obviate the need for the timber framing. In addition, there is no damage to the visible panel surfaces. The spacer band assumes the function of keeping straight the shell elements whose panels, e.g. hollow door panels, can no longer warp in the manner that this has always happened in the gluing art. It is now possible to join together without difficulty boards or panels of different thicknesses to form a shell element in a way which was not hitherto possible when employing conventional gluing techniques, due to the lack of sound attenuation. The novel fastener according to the invention provides greatly improved possibilities with respect to the sound attenuation. As a result of the new fastener, there is now no need for the high expenditure of air-conditioned storage of framing timbers or for difficult processing on expensive gluing processes, so that the shell element becomes considerably cheaper, thus making it more competetive in the price struggle against similar elements made from inorganic materials. In conjunction with the known advantages of wood as a building material, and particularly its esthetic appearance, this constitutes a market advantage for wood in connection with the manufacture of wood panels for floors, ceilings, and walls. The proposed fastener can also be used in a large number of new fields such as e.g. the attachment of solid wood, aluminium or plastic panels (cf FIG. 9) to boards or elements, the production of bearing floor elements with finished floorboards or ceilings or e.g. the punctiform attachment possibility for heavy objects to ceilings and walls.

In special cases, the fasteners can be driven in instead of pressed in. Instead of providing anchor legs on both longitudinal edges of the band-like base portion of the fastener (cf FIG. 8) they can also be provided on only a single longitudinal edge, for example for hanging down ceiling elements.

I claim:

1. A fastener, comprising:
   a base portion,
   at least two anchor legs projecting from said base portion in the same general direction, said two anchor legs having a pair of remote surfaces on the respective outer sides of said legs and a pair of proximate surfaces on the respective inner sides of said legs,
   at least one barb-like projection disposed on at least two of the surfaces of the group of surfaces comprising the two remote surfaces on the outer sides of said legs and the two proximate surfaces on the inner sides of said legs,
   a small bevel located on each of said legs on the same side as said barb-like projection and slanting towards the other, opposite surface of each of said legs towards the free ends of each of said legs,
   a large bevel located on each of said legs, each of said large bevels being on the side of each leg opposite said small bevel and slanted towards the free ends of said legs, so that said large bevels form wedge-like cutting edges with said small bevels at the free ends of said anchor legs.

2. A fastener according to claim 1,
   constructed in one piece,
   said two anchor legs being constructed homologously to one another,
   said two anchor legs being constructed of permanently deformable material.

3. A fastener according to claim 1, and further comprising
   two additional anchor legs projecting from said base portion in the same general direction which is opposite from said at least two anchor legs.

4. A fastener according to claim 1,
   constructed in an H-shaped manner and having two pairs of facing anchor legs, one pair arranged on one side of said base portion and the other pair arranged on the other side of said base portion, all of said anchor legs arranged at the ends of said base portion.

5. A fastener according to claim 1, wherein said base portion is a band and at least two pairs of facing anchor legs are provided on each of its longitudinal sides, the two ends of the band forming an H-shaped portion.

6. A fastener according to claim 1, wherein a pair of facing anchor fasteners which project away from said base portion in pairs in opposite directions is provided at each of two flange-like ends of a substantially U-shaped band-like base portion of said fastener serving at the same time as an attachment clip for said fastener and to this end provided with clip members.

7. A fastener according to claim 1, wherein said base portion is constructed as a band-like member and is in each case bent twice in opposite directions over the entire band width between two adjacent anchor leg pairs with pairwise homologously identically constructed anchor legs being aligned with one another in planes of parallel parts of said base portions.

8. A fastener according to claim 1, wherein said anchor legs are provided on only one of the two edges of said base portion.

9. A fastener according to claim 1, wherein pairs of anchor legs are arranged on each of the two edges of said base portion and project away from said base portion in opposite directions.

10. A fastener according to claim 1,
wherein said projections are arranged on the remote outsides of said anchor legs, said large bevels are arranged on the insides of said anchor legs, and said small bevels are arranged on the remote outsides of said legs.

11. A fastener according to claim 1, wherein said projections are arranged on the facing insides of said legs, the outsides of said legs being provided with large bevels converging in the direction of the free ends of said legs, and the insides of said legs being provided with opposite small bevels diverging towards the free ends of the said legs.

12. A fastener according to claim 1, constructed as a tubular solid of revolution, said anchor legs being arranged on its periphery as ring segments.

13. A fastener according to claim 1,
wherein said barb-like projections, large bevels, small bevels, cutting edges, and remote surfaces are located in planes extending at an angle of about 90° to the longitudinal median axis of said base portion.

14. A fastener according to claim 1, wherein said projections, small bevels large bevels, opposite shoulder surfaces, cutting edges, and remote surfaces extend in the longitudinal direction of flanges formed by a clip-like base portion of said fastener.

15. A fastener according to claim 1, wherein said large bevels comprise barb-like projections at their end towards said base portion.

* * * * *

UNITED STATES PATENT AND TRADEMARK OFFICE
CERTIFICATE OF CORRECTION

PATENT NO. : 4,213,374
DATED : July 22, 1980
INVENTOR(S) : Balthasar Hüsler

It is certified that error appears in the above-identified patent and that said Letters Patent are hereby corrected as shown below:

Claim 7, line 2, delete "in"
Claim 7, line 3, delete "each case"
Claim 14, line 2, before "large" insert -- , --
Claim 14, line 2, delete "opposite shoulder"
Claim 14, line 3, before "cutting" delete " surfaces, "

Signed and Sealed this

Twenty-first Day of October 1980

[SEAL]

Attest:

SIDNEY A. DIAMOND

Attesting Officer

Commissioner of Patents and Trademarks